United States Patent [19]
Blanc

[11] Patent Number: 5,838,388
[45] Date of Patent: Nov. 17, 1998

[54] VIDEO PREAMPLIFIER WITH DATA INSERTION

[75] Inventor: Jean-Pierre Blanc, Theys, France

[73] Assignee: SGS-Thomson Microelectronics S.A., Gentilly, France

[21] Appl. No.: 823,546

[22] Filed: Mar. 25, 1997

[30] Foreign Application Priority Data

Mar. 26, 1996 [FR] France .................................. 96 04069

[51] Int. Cl.⁶ .................................................. H04N 9/74
[52] U.S. Cl. ......................... 348/589; 348/600; 345/116
[58] Field of Search .................... 348/589, 600, 348/239, 575, 707; 345/144, 115, 116; H04N 5/57, 9/74

[56] References Cited

U.S. PATENT DOCUMENTS

| | | | |
|---|---|---|---|
| 4,860,106 | 8/1989 | Taupin et al. .............................. | 348/589 |
| 4,999,709 | 3/1991 | Yamazaki et al. ....................... | 348/589 |
| 5,418,576 | 5/1995 | Ross ......................................... | 348/589 |

FOREIGN PATENT DOCUMENTS

| | | |
|---|---|---|
| 0 449 106 A2 | 10/1991 | European Pat. Off. . |
| 0 486 129 A2 | 5/1992 | European Pat. Off. . |
| 0 553 910 A1 | 8/1993 | European Pat. Off. . |

Primary Examiner—Michael Lee
Attorney, Agent, or Firm—David V. Carlson; Seed and Berry LLP

[57] ABSTRACT

The present invention relates to a preamplifier including inputs for receiving input video signals representative of an image to be displayed on a screen, inputs for receiving logic signals representative of information to be displayed in superimposition on the screen, and outputs for supplying output video signals generated based on the input signals or the logic signals. An input receives a control signal to select which signals are used to generate the output video signals. In a first display mode, the signals used are the input signals, and in a second display mode, the signals used are the logic signals. Decoders and controllers allow monitoring of the state of the logic signals which select, in the second display mode, the input video signals to generate the output video signals.

10 Claims, 3 Drawing Sheets

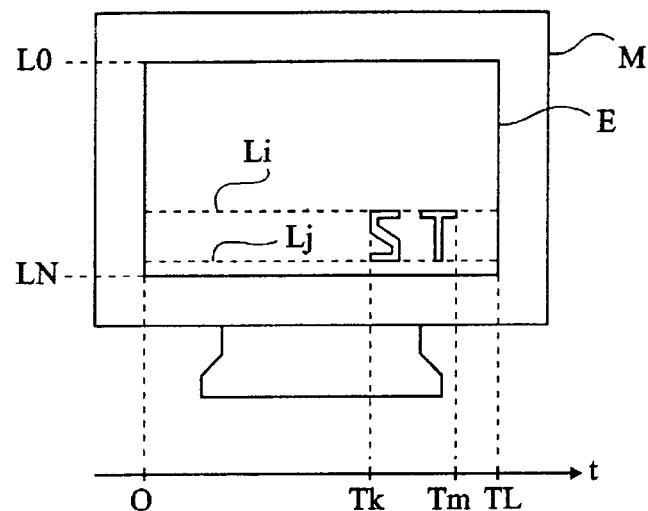
Fig 1A
Fig 1B
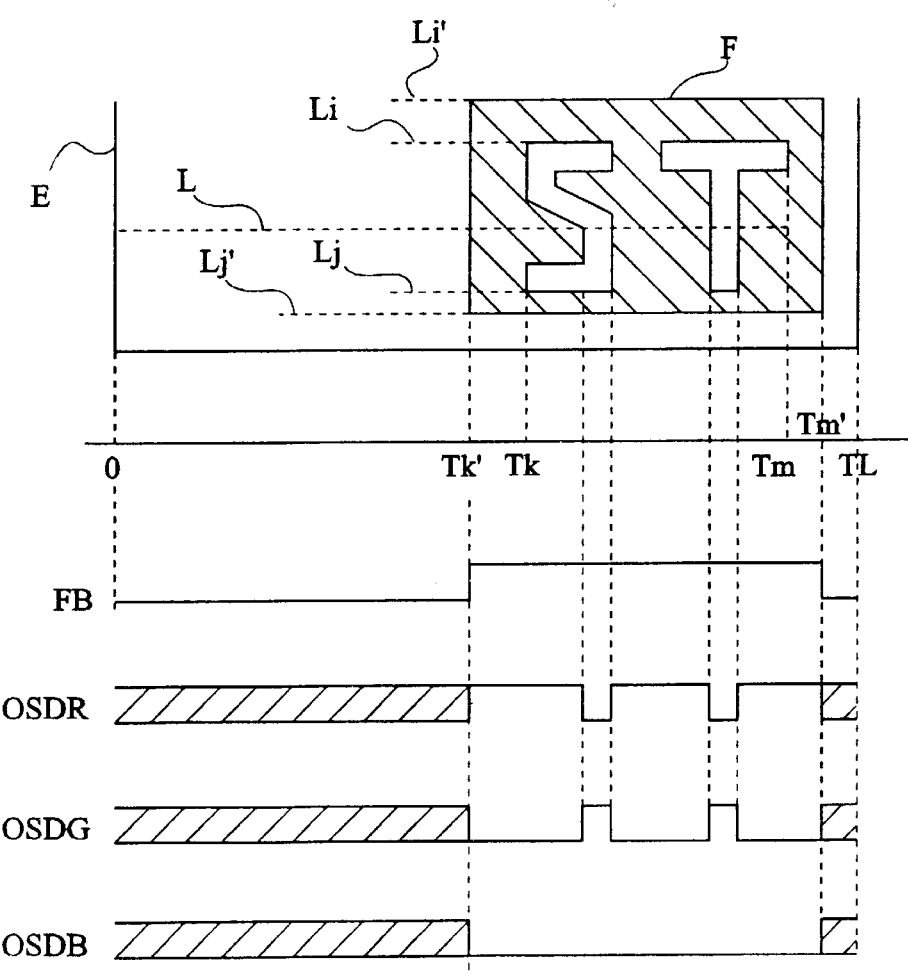
Fig 3A
Fig 3B
Fig 4A
Fig 4B
Fig 4C
Fig 4D

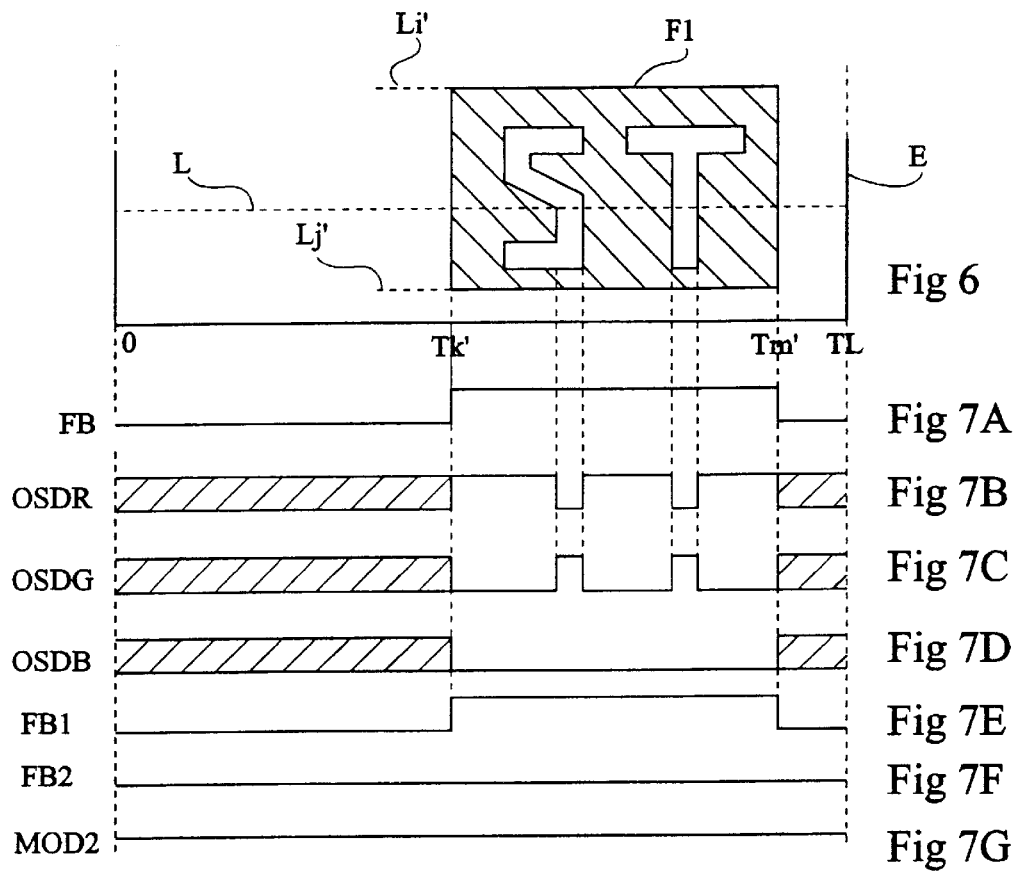
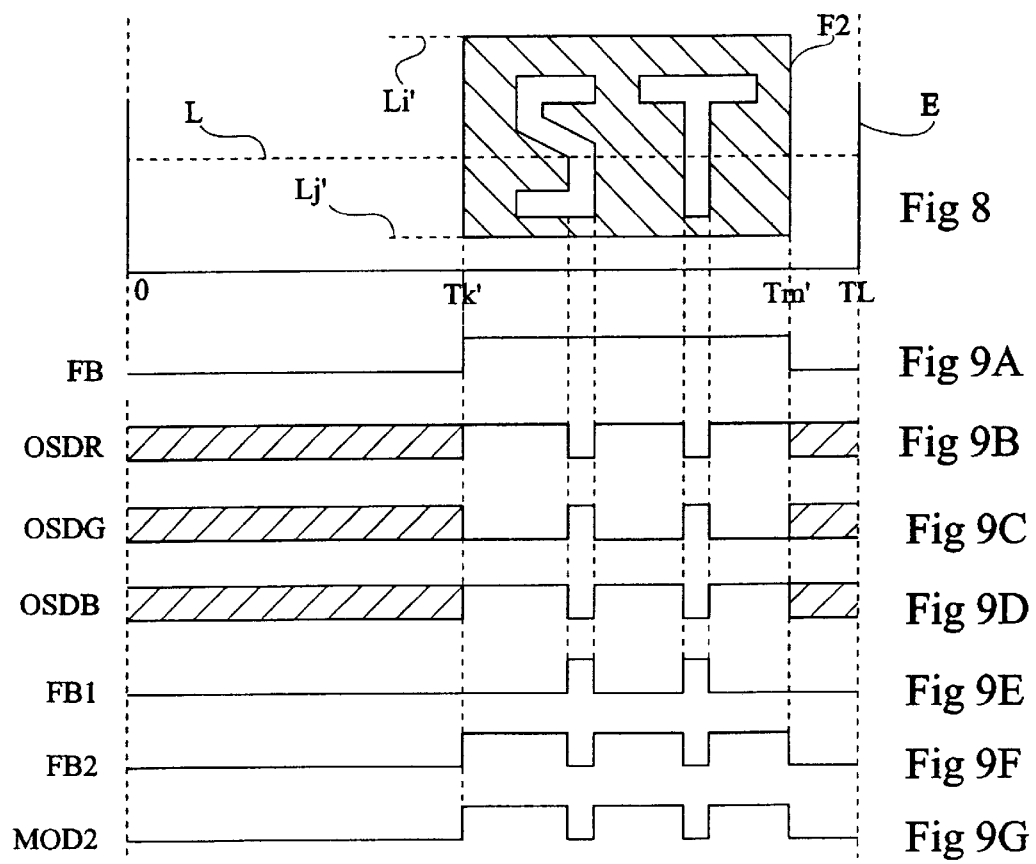

VIDEO PREAMPLIFIER WITH DATA INSERTION

BACKGROUND OF THE INVENTION

1. Field of the Invention

The present invention relates to a video preamplifier equipped with enabling means to insert information supplied by a signal generating circuit into an image displayed on a screen.

2. Discussion of the Related Art

The displaying of color images on the screen of a video monitor is usually performed by controlling a cathode-ray tube with three signals, commonly called R, G and B. These signals represent the decomposition into primary components (red, green, blue) of the images to be displayed. These signals are supplied by a source, for example a microcomputer, to an amplifying chain generally including a preamplifier used to process the signals (such as setting the contrast, the brightness, etc.) and a power amplifier used to amplify the processed signals and control the cathode-ray tube. The image display is conventionally performed by scanning the successive lines of the screen.

It is known to use a signal generating circuit commonly called an OSD (On Screen Display) circuit which displays information on the screen (for example, text), based on logic signals that it supplies to an amplifier. These logic signals differ from the signals R, G and B received by the preamplifier, and from the information being inserted in the displayed images. There are, for example, three logic signals, which can produce an information display over 8 colors.

FIG. 1A illustrates such an information insertion. A video monitor M includes a screen E. Screen E includes N lines (N being an integer) L0 to LN. The image display is performed by scanning the N lines. The scanning of a line is generally performed from the left of a line to the right. The lines are successively scanned, generally starting with the highest line (L0) on the screen and ending with the lowest line (LN) on the screen. The scanning of a line takes a time TL (using the starting time of the line scanning as a time reference).

In FIG. 1A, information is displayed in the lower right corner of the screen, the information appearing, as an example, in the form of letters S and T. The letters S and T are displayed on portions of successive lines Li to Lj, with i and j being integers such that i<j<N. The information is inserted as these lines are being scanned by altering the scanning between times Tk to Tm, with Tk<Tm<TL (see the time axis illustrated in FIG. 1B).

FIG. 2 schematically shows a preamplifier 5 used to insert the information (that is, in the example, letters S and T) in the images displayed on screen E.

Three data inputs 2, 4, and 6 receive three input video signals IR, IG, and IB representative of the images to be displayed on the screen. Three data inputs 8, 10, and 12 receive three logic signals OSDR, OSDG, and OSDB representative of the information (S and T) to be superimposed on the screen. Three data outputs 14, 16, and 18 supply output video signals OR, OG, and OB generated based on the input video signals or the logic signals. A control input 20 receives a logic control signal FB. This signal monitors switches 38, 40, and 42 which selectively connect outputs 14, 16, and 18 either to inputs 2, 4, and 6 or to inputs 8, 10, and 12. It will, for example, be assumed that the outputs are connected to inputs 2, 4, and 6 when signal FB is in the low state and that these outputs are connected to inputs 8, 10, and 12 when signal FB is in the high state.

In the above example, the information is directly inserted into the images shown on the screen. A problem of readability then arises for this information, which can be more or less clearly made out according to the colors, the contrast and the brightness of the image portion where the information is inserted. A solution which is currently used, for example, in the field of television receivers, is to display the information in a bright color to which the human eye is sensitive, such as yellow. In practice, this solution appears to be injudicious in the field of video monitors connected to computers, the image being generally comprised of texts, which increases the difficulty of visualizing an information which also appears in the form of texts.

Another solution is to display the information on the screen in a certain color, within a background of another color. The background is processed as information, that is, it is generated based on logic signals supplied by the signal generating circuit.

This example is illustrated in FIG. 3A which shows a portion of a screen E. The background is shown by a hatched rectangle F delimited by a continuous outline, within which the information (letters S and T) is displayed. The background and the information are displayed on portions of successive lines Li' to Lj', with i' and j' being integers such that i'<i<j<j'<N. The background is displayed as these lines are being scanned by altering the scanning between times Tk' to Tm', with Tk'<Tk<Tm<Tm'<TL (see the time axis illustrated in FIG. 3B).

FIGS. 4A to 4D illustrate the time history of the signals supplied by the signal generating circuit during the display of a line L included between lines Li and Lj, and a portion of which is thus used to display a portion of letters S and T. As an example, it will be assumed that letters S and T are displayed in green and that the background is red.

The scanning of line L can be divided into three successive time phases:
  a first phase, between times 0 and Tk', the color of the points displayed on the portion of line L scanned during this first phase being controlled by input signals IR, IG, and IB,
  a second phase, between times Tk' and Tm', the color of the points displayed on the portion of line L scanned during this phase being controlled by input signals OSDR, OSDG, and OSDB,
  a third phase, between times Tm' and TL, the color of the points displayed on the portion of line L scanned during this phase being controlled by input signals IR, IG, and IB.

During the first and third phases, control signal FB (illustrated in FIG. 4A) is in the low state, and logic signals OSDR, OSDG, and OSDB can indifferently be in a high state or in a low state. During the second scanning phase, control signal FB is in the high state.

Between times Tk' and Tm':
  OSDR=1 (illustrated in FIG. 4B) and OSDG=OSDB=0 (illustrated in FIGS. 4C and 4D) during the scanning of the line portions used to form part of the displayed background, and
  OSDG=1 and OSDR=OSDB=0 during the scanning of the line portions used to form portions of the displayed letters S and T.

The information is more readable and information can be displayed in one or several colors which can be less offensive than yellow. A disadvantage is that although a fine readability of the information can be obtained in relation to the background, it cannot be ensured that the background can be visually made out from the image.

Another solution is to create a so-called semi-transparent background, based on the image displayed on the screen, either by darkening the image and displaying the information in a light color, or by lightening the image and displaying the information in a dark color. Thus, the probability of increasing the contrast between the background and the image, and thus increasing readability, is increased (except, possibly, if a very dark image is darkened or if a very light image is lightened). Besides, a less significant image portion is lost when information is displayed, making the insert less conspicuous.

A problem arises if it is desired to offer a user the choice of a display with a background of the conventional type (with a given color, defined by the signals generated by the signal generating circuit), or with a semi-transparent background. Since signal generating circuits generate information in the form of logic signals, the managing of information by a preamplifier is performed based on control signals differentiated from the information to be displayed. Thus, if the user is to be provided a choice of the type of background, an additional control signal has to be available.

One solution is to use switching control signal FB, which then is a logic signal with at least three states. In this case, it is necessary to use a specific signal generating circuit, which implies additional costs. Besides, the profit of a compatibility between the CMOS logic and the TTL logic is then lost.

Another solution is to use a specific control signal to control the display in a semi-transparent background. This also includes a specific signal generating circuit (which implies additional costs), which includes an additional output, and thus is more complex.

SUMMARY OF THE INVENTION

An aim of the present invention is to provide a managing system for information display options, such as display on a background which can be selected to be either semi-transparent or colored, the control of which can be performed from a conventional signal generating circuit, i.e., which does not require a three-state logic and with no additional output.

For this purpose, one of the signal combinations generated by the signal generating circuit is dedicated to the monitoring of the display option managing system. Thus, the present invention relates to a preamplifier including data inputs for receiving input video signals representative of an image to be displayed on a screen, data inputs for receiving logic signals representative of information to be displayed in superimposition on the screen, data outputs for supplying output video signals generated based on the input video signals or the logic signals, and a control input for receiving a logic control signal. First selection means are monitored by the control signal, which selects the signals used to generate the output video signals, the signals used being the input video signals in a first display mode, and the signals used being the logic signals in a second display mode. The preamplifier includes decoding and control means responsive to the logic signals, and second selection means monitored by the decoding and control means for selecting, in the second display mode, the input video signals to generate the output video signals.

These objects, characteristics and advantages as well as others, of the present invention, will be discussed in detail in the following non-limiting description of an example of embodiment of the present invention, in relation with the accompanying drawings.

BRIEF DESCRIPTION OF THE DRAWINGS

FIG. 1A illustrates the display of information inserted on a screen,

FIG. 1B shows a time axis along which a line scanning of a screen is plotted,

FIG. 3A shows the display on a screen of an information in a color background,

FIG. 3B shows a time axis along which a line scanning of a screen is plotted,

FIGS. 4A to 4D show timing diagrams of signals implemented for the display of FIG. 3A, FIG. 5 schematically shows a circuit according to the present invention, FIG. 6 shows the display on a screen of information in a color background, using the circuit of FIG. 5, FIGS. 7A to 7G show timing diagrams of signals implemented for the display illustrated in FIG. 6, FIG. 8 shows the display on a screen of an information in a semi-transparent background, FIGS. 9A to 9G show timing diagrams of signals implemented for the display of FIG. 8.

DETAILED DESCRIPTION

Figure 2:
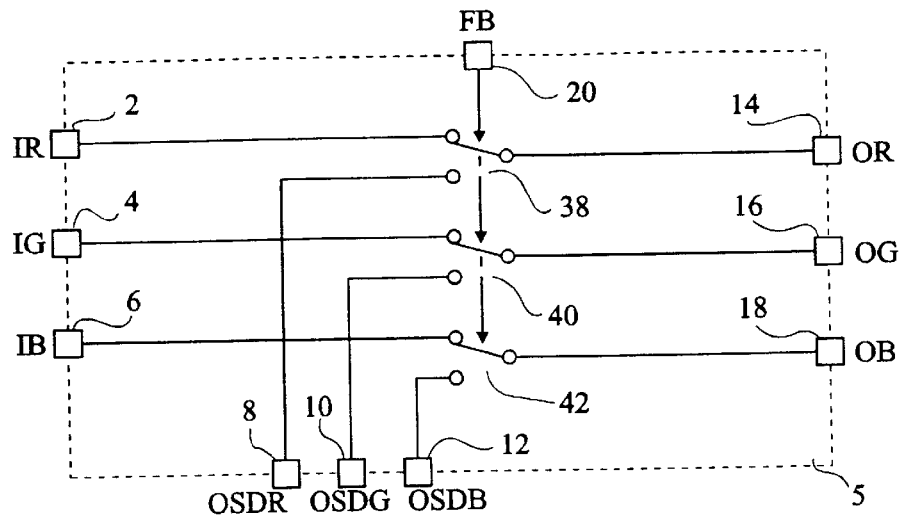
FIG. 2 schematically shows a preamplifier according to the state of the art.
Figure 5:
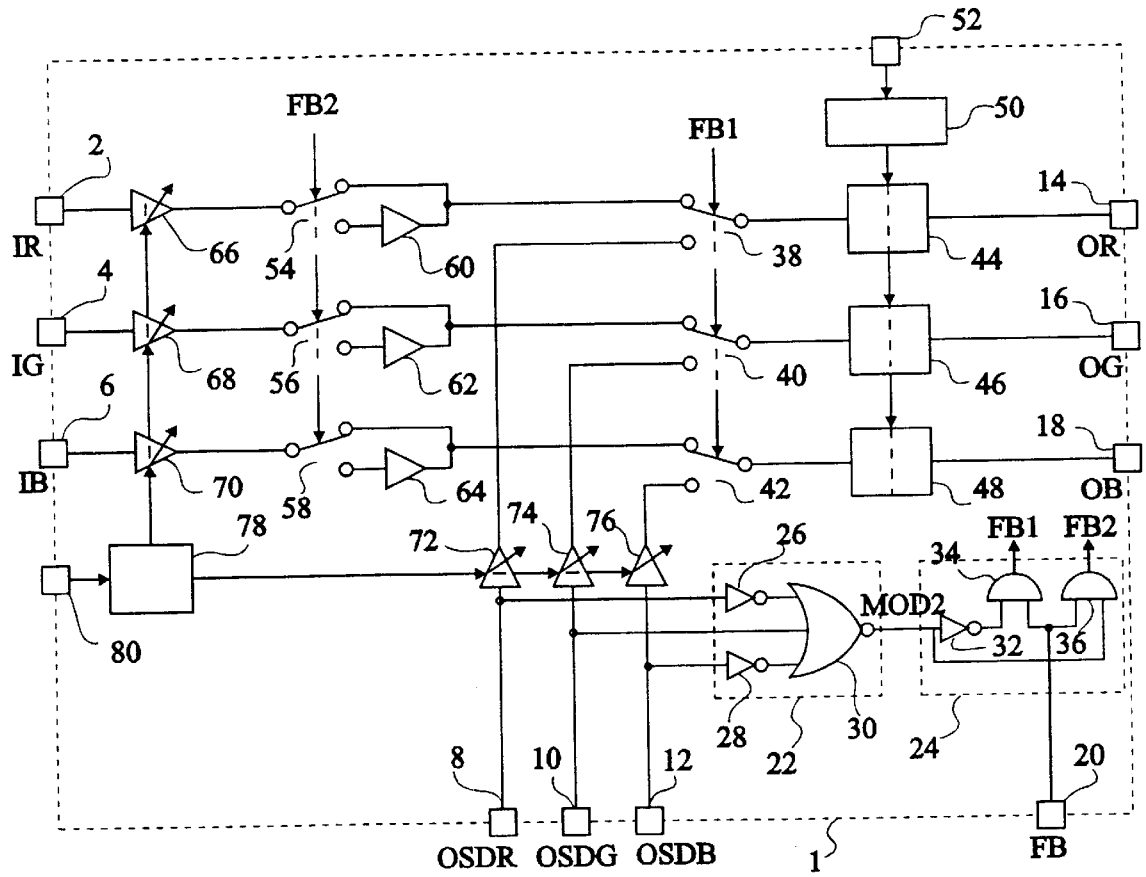

FIG. 5 schematically shows a preamplifier 1 implemented according to the present invention.

This preamplifier includes:

three data inputs 2, 4, and 6 for receiving three input video signals IR, IG and IB representative of an image to be displayed on a screen. These signals are for example supplied by a microcomputer, the images being displayed on the screen of a video monitor, three data inputs 8, 10, and 12 for receiving three logic signals OSDR, OSDG, and OSDB representative of information to be inserted in superimposition on the screen. These signals are supplied by a signal generating circuit of the On-Screen-Display type, three data outputs 14, 16, and 18 for supplying output video signals OR, OG, and OB generated based on input video signals or logic signals, a control input 20 for receiving a logic control signal FB supplied by the signal generating circuit, this signal monitoring the superimposed display of information received on inputs 8, 10, and 12.

In an image display mode, the signals used to generate the output signals are the input video signals. In an information display mode, the logic signals are additionally used. In the information display mode, information can be displayed on the screen in a background generated either based on the logic signals or based on the input video signals.

The preamplifier includes a decoding circuit 22 receiving signals OSDR, OSDG, and OSDB and generating a logic signal MOD2 for indicating the type of background used in the information display mode. A control circuit 24 generates, based on signals MOD2 and FB, control signals FB1 and FB2 used to monitor the selection means so as to selectively supply at the preamplifier output, either the logic signals or the input video signals to display the background.

Decoding circuit 22 includes logic components for generating signal MOD2 so that this signal is in an active state when one combination of the logic signals is supplied to the preamplifier, and in another state otherwise. In the example illustrated, this combination is assumed to correspond to the color Magenta (then, OSDR=1, OSDG=0 and OSDB=1) and the active state of signal MOD2 is assumed to be the high state. Circuit 22 includes two inverters 26 and 28 and a NOR-type three-input logic gate 30. Signals OSDR and OSDB are inverted by inverters 26 and 28, respectively. The outputs of the inverters are connected to two inputs of gate 30 and the third input receives signal OSDG. Gate 30 produces signal MOD2 at its output. Thus, when the combination (1, 0, 1) appears respectively at the inputs 8, 10, and 12, the signals supplied to gate 30 are all in the low state. Accordingly, signal MOD2 switches to the high state.

Control circuit 24 receives signals MOD2 and FB. It generates signals FB1 and FB2 so that one of these signals is in an active state when signal FB is in an active state. It is assumed, as an example, that an active state corresponds to a high state. Circuit 24 includes an inverter 32 and two AND-type two-input logic gates 34 and 36. Gate 34 receives signal FB and the signal complementary to signal MOD2, which has been inverted by inverter 32. Gate 34 generates signal FB1. Gate 36 receives signals FB and MOD2, and generates signal FB2.

When signals FB and MOD2 are active, signal FB2 is active and signal FB1 is inactive. In this case, the background is implemented based on the input video signals. Conversely, when only signal FB is active, signal FB I is active and signal FB2 is inactive. In this case, the background is implemented based on the logic signals. If signal FB is in the inactive state, signals FB1 and FB2 are also inactive. In this case, no information is inserted in the image displayed on the screen.

The preamplifier illustrated in FIG. 5 conventionally includes circuits for processing the signals received. Thus, circuits receiving the input video signals and setting the contrast of these input video signals are shown in the form of variable-gain amplifiers 66, 68, and 70. Circuits receiving the logic signals and setting the contrast of the logic signals are also shown in the form of variable-gain amplifiers 72, 74, and 76. The amplifier gain is controlled by a contrast-control circuit 78, which receives control signals from a control input 80.

In FIG. 5, circuits 44, 46, and 48 are connected, respectively, to outputs 14, 16, and 18. These circuits, for example, are used to set the brightness and for amplification. The circuits 44, 46, and 48 are all controlled by a control circuit 50, which receives control signals from a control input 52. The details of these different components of the preamplifier will not be discussed, for this type of circuit is well known by those skilled in the art.

In addition to the above-mentioned circuits, the amplifier includes means for selecting the received signals used to generate the output video signals. This selection is based on whether the mode is an image display mode or an information display mode, and in this latter case according to whether the background is defined based on the logic signals or on the input video signals.

Switches 38, 40 and 42 enable the circuit to selectively generate output signals OR, OG, and OB either based on video signals IR, IG, and IB (when no information is to be displayed on the screen or when information is displayed in a semi-transparent background) or based on logic signals OSDR, OSDG, and OSDB (when information is to be displayed on the screen). These switches are placed between the data inputs and the circuits for setting the brightness and for amplification. When signal FB1 is inactive, circuits 44, 46, and 48 receive the input video signals, after setting the contrast. When it is active, these circuits receive the logic signals.

Switches 54, 56, and 58 enable the circuit to generate output signals OR, OG, and OB based on video signals IR, IG, and IB by processing these signals according to the selected mode, i.e., with or without information display. These switches are placed, in the example, between the circuits for setting the contrast and switches 38, 40 and 42. These switches enable the circuit to supply the input video signals either directly to switches 38, 40, and 42 or via processing circuits, which process these signals according to the type of background desired when information is displayed. These processing circuits are for example amplifiers 60, 62, and 64 with a gain lower than one, so that the background is obtained by darkening the image displayed. These processing circuits can have, in another example of the amplifiers, a gain which is higher than one, so that the background is obtained by lightening the image displayed.

If signal FB2 is inactive, the signals supplied to circuits 44, 46, and 48 are the signals generated by the circuits for setting the contrast. If signal FB2 is active, the signals supplied to circuits 44, 46 and 48 are the signals generated by the processing circuits.

The above description is, above all, a functional description, as the implementation of the present invention should cause no particular problem for those skilled in the art. Thus, the switches will not necessarily by physically implemented switches. This will for example depend on whether voltage or current signals are used.

FIG. 6 shows the display on a screen E of information in a colored background generated based on logic signals (in a way similar to the example illustrated in FIG. 3). As an example, the information appears in the form of two green-colored letters S and T placed in a red-colored background F 1, the background shown in FIG. 6 as a hatched rectangle delimited by a continuous outline. The background and the information are displayed on portions of successive lines Li' to Lj' of the screen, by altering the scanning of these lines between times Tk' and Tm' of the scanning.

Signals 7A to 7G show timing diagrams of signals FB, OSDR, OSDG, OSDB, FB1, FB2, and MOD2 for a line L of the screen on a portion of which both the background and letters S and T are displayed.

The scanning of line L can be divided into three successive time phases:

a first phase, between times 0 and Tk', the color of the points displayed on the portion of line L scanned during this phase being controlled by input video signals IR, IG, and IB. The line portion scanned during this phase thus forms a portion of the displayed image, a second phase, between times Tk' and Tm', the color of the points displayed on the portion of line L scanned during this phase being controlled by logic signals OSDR, OSDG, and OSDB, and a third phase, between times Tm' and TL, the color of the points displayed on the portion of line L scanned during this phase being controlled by the input video signals.

During the second scanning phase, signal FB (illustrated in FIG. 7A) is active. Signals MOD2 and FB2 (illustrated in FIGS. 7G and 7F) are inactive, and signal FB1 (illustrated in FIG. 7E) is active. During the first and third phases, signals FB, FB1, and FB2 are inactive and signals MOD2, OSDR, OSDG, and OSDB indifferently are in the high state or in the low state.

During the second scanning phase:

OSDR=1 and OSDG OSDB=0 (these signals are illustrated in FIGS. 7B to 7D) during the scanning of portions of the line used to form part of the red background displayed, and OSDR=OSDB=0 and OSDG=1 during the scanning of portions of the line used to form portions of the displayed letters S and T.

FIG. 8 shows the display on a screen E of an information in a semi-transparent background generated based on input video signals.

As an example, the information appears as green-colored letters S and T placed in a background F2 shown in FIG. 8 as a hatched rectangle delimited by a continuous outline. Background F2 is, for example, implemented by darkening the portion of the displayed image in the area corresponding to the rectangle. The background and the information are displayed on portions of successive lines Li' to Lj' of the screen, by altering the scanning of these lines between times Tk' and Tm' of the scanning.

Signals 9A to 9G show timing diagrams of signals FB, OSDR, OSDG, OSDB, FB1, FB2, and MOD2 for a line L of the screen on a portion of which both the semi-transparent background and the information are displayed.

The scanning of line L can be divided into three successive time phases:

a first phase, between times 0 and Tk', the color of the points displayed on the portion of line L scanned during this phase being controlled by input video signals IR, IG, and IB. The line portion scanned during this phase thus forms part of the displayed image, a second phase, between times Tk' and Tm', the color of the points displayed on the portion of line L scanned during this phase being controlled by logic signals OSDR, OSDG, and OSDB. The logic signals are then used either to directly define the color of the points of the line used to form letters S and T or as selection control signals to control the source of the output signals. In this latter case, the color of the points used to form the background is defined by the input video signals, the background corresponding to the displayed image, which is processed so as to be, for example, darker than if no information was displayed, a third phase, between times Tm' and TL, the color of the points displayed on the portion of line L scanned during this phase being controlled by the input video signals.

During the second scanning phase, signal FB (illustrated in FIG. 9A) is active. During the first and third phases, signals FB, FB1, and FB2 are inactive and signals MOD2, OSDR, OSDG and OSDB indifferently are in the high state or in the low state.

During the second scanning phase:

OSDR=OSDB=1 and OSDG=0 (these signals are respectively illustrated in FIGS. 9B, 9D and 9C) during the scanning of portions of the line used to form part of the semi-transparent background displayed. Signals MOD2 and FB2 (illustrated in FIGS. 9G and 9F) then are active, and signal FB1 (illustrated in FIG. 9E) then is inactive. The signals used to define the background color then are the input video signals.

OSD=OSDB=0 and OSDG=1 during the scanning of portion of the line used to form portions of the displayed letters S and T. Signals MOD2 and FB2 then are inactive, and signal FB1 is active.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

I claim:

1. A preamplifier including:
    a set of data inputs for receiving input video signals representative of an image to be displayed on a screen;
    a second set of data inputs for receiving logic signals representative of information to be displayed in superimposition on the screen;
    a set of data outputs for supplying output video signals generated based on the input video signals or the logic signals;
    a control input for receiving a logic control signal;
    a first selection means monitored by the control signal, for selecting signals used to generate the output video signals, the signals used being one from a group of the input video signals in a first display mode, and the logic signals in a second display mode;
    a decoding and control means responsive to the logic signals; and
    second selection means monitored by the decoding and control means for selecting, in the second display mode, the input video signals to generate the output video signals.

2. A preamplifier according to claim 1, wherein the control means control the second selection means according to a given logic combination of the logic signals.

3. A preamplifier according to claim 2, wherein the second selection means are controlled to generate, when the control signal is active, the output video signals based on the input video signals, which are modified, and wherein the control of the first selection means is then forced to a state corresponding to the first display mode.

4. A preamplifier according to claim 3, wherein the input video signals are modified so that the information is displayed in a semi-transparent background created based on the input video signals.

5. A preamplifier used to select signals for amplification comprising:
    a set of video data inputs for receiving video signals;
    a set of video processing circuits coupled to the set of video data inputs for processing the video signals into modified video signals;
    a set of logic signal inputs for receiving logic video signals;
    a set of video outputs for providing video output signals;
    logic circuitry coupled to the video data inputs, the video processing circuits, the logic signal inputs, and the video outputs, the logic circuitry for alternatively coupling, based on the logic video signals, the video outputs to one set of signals selected from the group of the video signals, the modified video signals, and logic video signals.

6. The preamplifier of claim 5, further including:
    a control input for accepting a control signal, wherein the logic circuitry is additionally connected to the control input.

7. The preamplifier of claim 5 wherein the set of video processing circuits includes video amplifiers having a gain of less than unity.

8. The preamplifier of claim 5 wherein the set of video processing circuits includes video amplifiers having a gain of greater than unity.

9. The preamplifier of claim 6 wherein the logic circuitry further comprises a series of logic gates adapted to select one type of signals for output from the three types of video signals based on a state of the control signal and a state of the logic video signals.

10. The preamplifier of claim 9 wherein the state of the logic video signals is determined by coupling the logic signal inputs to one or more logic gates so as to cause a plurality of outputs from the logic gates to each generate a respective signal when the logic signals are in respective predetermined states.

* * * * *